United States Patent [19]

Fryer

[11] 4,013,889
[45] Mar. 22, 1977

[54] ELECTRONIC AMPLIFICATION

[75] Inventor: Austen John Fryer, Welwyn Garden City, England

[73] Assignee: Hawker Siddeley Dynamics Limited, England

[22] Filed: June 9, 1975

[21] Appl. No.: 584,854

[30] Foreign Application Priority Data

June 13, 1974 United Kingdom ............ 26234/74

[52] U.S. Cl. .............................. 250/332; 250/349;
250/338; 250/394
[51] Int. Cl.² ........................................ H01J 31/49
[58] Field of Search .......................... 250/330–334, 250/338, 340, 349, 394

[56] References Cited

UNITED STATES PATENTS 3,597,617   8/1971   Passaro ............................... 250/334
3,808,435   4/1974   Bate et al. ........................... 250/332

*Primary Examiner*—Davis L. Willis
*Attorney, Agent, or Firm*—Rose & Edell

[57] ABSTRACT

Scanning apparatus for scanning a field of view having a multidetector array which traverses the field of view, the detectors of which are sensitive to variations in electromagnetic radiation wherein each detector is a.c. coupled to an amplifier in a respective video channel and at the end of each scan the gains of the amplifiers in the said channels are equalized one with another.

7 Claims, 1 Drawing Figure

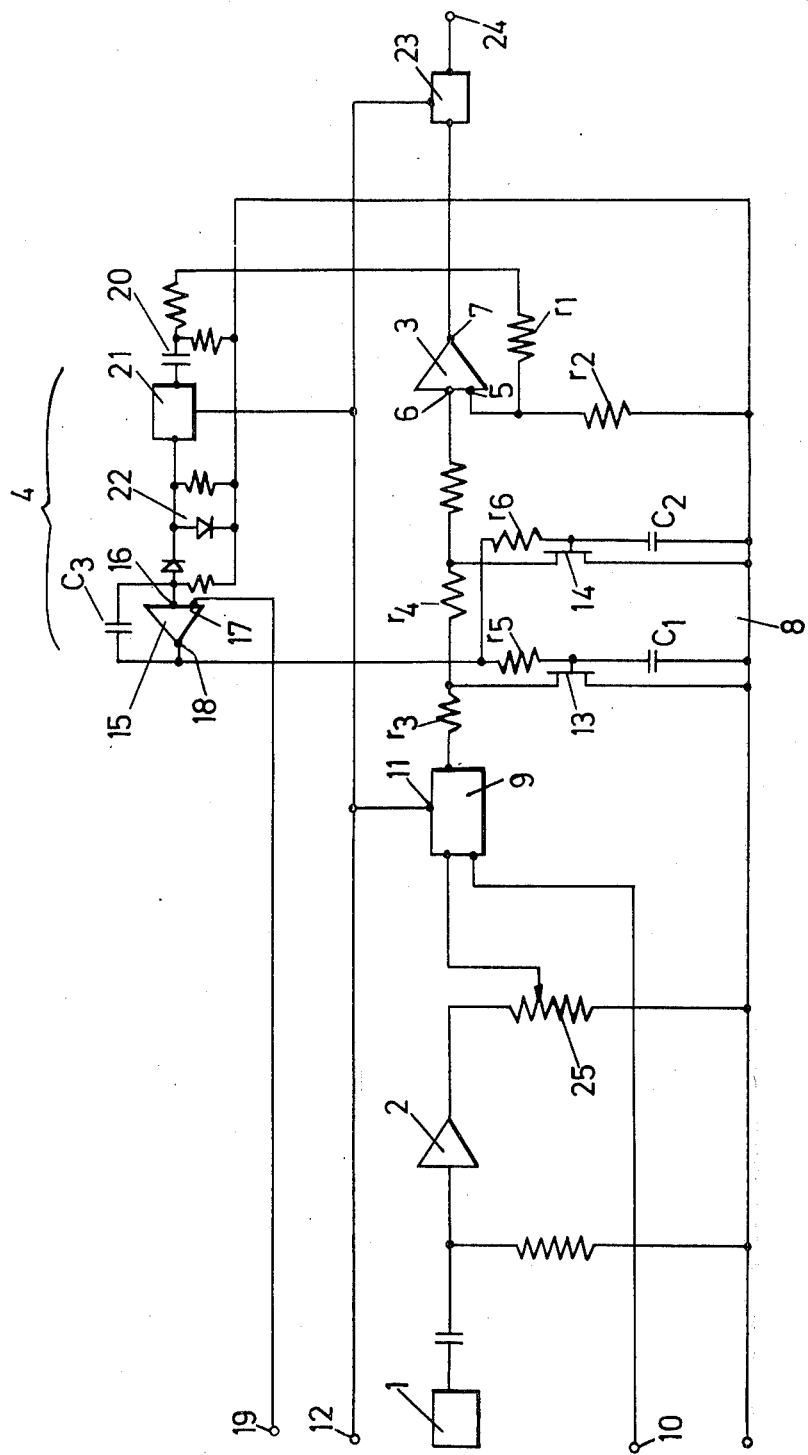

ELECTRONIC AMPLIFICATION

BACKGROUND OF THE INVENTION

In some forms of surveillance system, especially those operating by the detection of radiation in the infra-red spectrum, a multi-element array of detector elements is used to scan an image of the field of view. The different detectors scan different parts of the scene and, generally, each detector is provided with its own video amplifying channel and is coupled to its respective amplifier by means of a.c. coupling. However, since different detectors scan different parts of the scene, their output wave forms will in general be different and the a.c. coupling will progressively charge in each raster scan to result in different mean voltages. To produce an image of the scene with high fidelity it becomes necessary to make the a.c. coupling time constants long enough to prevent the differences in the voltages taken up by the different a.c. couplings from becoming large enough to become perceptible in the course of one raster scan. At the end of each raster scan it is then necessary to restore the charges taken up by the different couplings to a common value while the detectors are looking at a common reference source of radiation. Thus all the channels begin the next scan reset to a common level so that if the respective detectors scan across a uniform patch of the scene the image of the latter will appear uniform in the display.

This invention relates to scanning arrangements which are suitable for but not necessarily restricted to surveillance systems. Herein it is described in relation to surveillance scanners. It has as its object the provision of scanning apparatus in which the detector video amplifier channels have improved characteristics.

It is conventional to provide a reference source of radiation within the scanning apparatus. However, the radiation output of the reference source may sometimes differ greatly from the radiation received from the field of view and under these circumstances large differences between the detector outputs when viewing the reference source and when viewing the scene may be unavoidable. In such circumstances unless the gains of the different detector amplifiers are precisely the same, the display output which is set equal when viewing the reference source will nevertheless differ when viewing a uniform area of the scene.

SUMMARY OF INVENTION

Thus, according to the invention, there is provided scanning apparatus having a multidetector array which traverses a field of view, the detectors of which are sensitive to variations in electromagnetic radiation and wherein each detector is a.c. coupled to an amplifier in a respective video channel and means which equalizes the gains of the amplifiers in the said channels one with another at the end of each scan.

Said means may comprise a reference a.c. source, switch means for temporarily switching the a.c. source into the inputs of each detector amplifier at the end of each scan in lieu of the output of the respective detector, and, for each channel, respective controllable attenuator means controlling the gain of the detector amplifier and an integrating amplifier means which compares the output of the detector amplifier when the latter is coupled to the a.c. reference source with a further reference signal, integrates any resultant difference signal and applies the integrand signal as a drive for the said controllable attenuator means thereby resetting the gain of the channel so as to reduce the said difference signal to zero.

BRIEF DESCRIPTION OF DRAWING

Hereinafter the invention is described with reference to the single accompanying drawing which illustrates a detector 1, a detector pre-amplifier 2, a detector main amplifier 3 and a main amplifier gain control circuit (AGC) 4.

DESCRIPTION OF EMBODIMENT

The main amplifier 3 has an inverting input 5, a non-inverting input 6 and an output 7. Output 7 is connected to a potential dividing network comprising series connected resistors $r_1$ and $r_2$. The junction between resistors $r_1$ and $r_2$ is connected to the inverting input of the said amplifier. The non-inverting input 6 of the amplifier 3 is connected to receive a signal from an attenuator circuit 8, the latter being in turn connected to receive from a switch circuit 9 either the video input from the pre-amplifier 2 or a 20 KHz reference signal from an input terminal 10. Switch circuit 9 may comprise a standard gate driver integrated circuit such as that supplied by Siliconix Type No. DG188. Gate driver circuit 9 exhibits two stable conditions. A first condition, which corresponds to a first voltage level on gate input 11, results in the video signal from the detector being fed to the attenuator 8. The second condition which corresponds to a second voltage level applied to gate 11 results in the 20 KHz reference signal being applied to the attenuator 8. The second voltage level is provided in the form of a pulse at terminal 12 at the end of each scan.

The attenuator 8 comprises a two-stage setting device, there being a series connected resistor $r_3$, $r_4$ and a shunt connected FET 13, 14 in each stage thereof. AGC circuit 4 sets a d.c. voltage on each of the capacitors $C_1$, $C_2$ which voltage is therefore always present on the respective gates of the FET's 13, 14. Each FET constitutes variable resistance which shunts the input of the main amplifier.

AGC circuit 4 comprises a second amplifier 15 having a non-reversing input 16, a reversing input 17 and an output 18. The output 18 is connected to the capacitors $C_1$, $C_2$ via respective resistances $r_5$, $r_6$ and to the gates of the said FET's 13, 14. It is also connected to the non-inverting input 16 of the second amplifier 15 via an integrating capacitor $C_3$. The inverting input 17 of the amplifier 15 is connected to a d.c. reference signal provided on terminal 19.

The non-inverting input 16 of the second amplifier 15 also receives a signal from the output of the main amplifier 3 via an a.c. coupling circuit 20, a switch 21 and a negative peak voltage detecting circuit 22 of conventional form. Switch 21 constitutes a second gate driver similar to the first and may be such as that supplied by Siliconex Type DG181. This switch is normally open circuited during the normal scan period and is closed during the period that the 20 KHz reference signal is connected onto the attenuator 8, being connected to receive the control signal on terminal 12.

A third switch 23 is connected between the junction of the a.c. coupling circuit 20 and the main amplifier 3 output on the one hand and the output terminal 24 on the other. This switch is closed during the normal scan period and is open circuited during the period that the 20 KHz reference signal is connected onto the attenuator 8, being connected to receive the control signal on terminal 12. Switch 23 constitutes a third gate driver and may be such as that supplied by Siliconex Type No. DG184.

The circuit operates in the following manner. During the scan of the field of view the respective amplifier 3 receives a video signal from its respective pre-amplifier via a presetting potentiometer 25, switch 9 and attenuator 8 and it supplies an output signal to terminal 24 via switch 23. During the scan switch 21 is open circuited and switch 23 is closed. At the end of the scan all three switches 9, 21 and 23 are responsive to a pulse on terminal 12 such that the 20 KHz reference signal is now connected to the attenuator 8, switch 21 is closed thus coupling amplifier 15 to the rectified output of amplifier 3, and switch 23 is open circuited. Any difference between the d.c. reference signal applied on terminal 19 and the output of the negative peak detecting circuit 22 is integrated in amplifier 15 and the output thereof applied to reset the FET's 13 and 14 so as to reduce the difference at the input of amplifier 15. At the end of the pulse applied on terminal 12 the circuit resets so that the video signal is once again passed to the amplifier 3, the switch 23 is closed and the switch 21 open circuited. The gain of the channel is now equalized to the gain of the corresponding other channels and the apparatus is set up for the next scan of the field of view.

The detectors may be chosen for sensitivity to any part of the electro-magnetic spectrum.

It will be appreciated by those skilled in the art that other forms of circuits may be used to carry out the equalizing operation described herein, and all such circuits are considered to embody the spirit of the invention and fall within the scope of the appended claims.

I claim:

1. For use in a scanning apparatus of the type in which a multi-detector array traverses a field of view, the detectors being sensitive to variations in electro-magnetic radiation, and wherein a plurality of video channels correspond in number with the number of detectors constituting the array, each channel being electrically coupled to a respective detector and incorporating an a.c. coupled amplifier for amplifying the signal received from the respective detector, an improvement for equalizing the gains of said amplifiers, one with another, at the end of each scan, using a reference a.c. source which is temporarily applied to input of each detector amplifier at the end of each scan in lieu of the output of the respective detector, said improvement comprising in each channel:

controllable attenuator means controlling the gain of the channel detector amplifier;

integrating amplifier means for comparing the output of the channel detector amplifier when the latter is coupled to the a.c. reference source with a further reference signal and integrating any resultant difference signal; and means for applying integrated signal as a drive for the said controllable attenuator means to reset the gain of the channel so as to reduce the said difference signal to zero.

2. Scanning apparatus comprising a multi-detector array which traverses a field of view, the detectors of which are sensitive to variations in electromagnetic radiation and a plurality of video channels corresponding in number with the number of detectors constituting the array, each channel being electrically coupled to a respective detector and incorporating an a.c. coupled amplifier for amplifying the signal received from the respective detector, said apparatus further comprising means for equalizing the gains of said amplifiers, one with another, at the end of each scan, said means comprising a reference a.c. source, switch means for temporarily switching the a.c. source into the input of each detector amplifier at the end of each scan in lieu of the output of the respective detector and, in each channel, respective controllable attenuator means controlling the gain of the respective detector amplifier and an integrating amplifier means which compares the output of the respective detector amplifier when the latter is coupled to the a.c. reference source with a further reference signal, integrates any resultant difference signal and applies the integrand signal as a drive for the said controllable attenuator means thereby resetting the gain of the channel so as to reduce the said difference signal to zero.

3. Scanning apparatus according to claim 2 wherein the controllable attenuator means in each channel comprises a two stage circuit each stage having a series connected resistor and a shunt connected F.E.T. the drive electrode of which is coupled to the output of the respective integrating amplifier.

4. Scanning apparatus according to claim 3 wherein the outputs of the detector amplifiers in the respective channels are coupled to the input of the integrating amplifier at the end of each scan via a rectifying circuit.

5. Scanning apparatus according to claim 4 wherein the said rectifying circuit comprises an a.c. voltage peak detecting circuit.

6. A method of equalizing the gains in a plurality of a.c. coupled video detector-amplifier channels of a surveillance system having an array of scanning electromagnetic radiation detectors wherein at the end of each scan a common sinusoidal reference signal is injected at the inputs of the said video channels and is detected at the outputs of the said channels and a representation of said detected signal is compared with a further reference signal representative of a predetermined common gain and, in each channel, any difference signal is used to drive a respective servo means which controls the gain of the said channel, thereby adjusting said gain to the said common value.

7. The method of claim 6 wherein the said signal representative of the said detected sinusoidal reference signal comprises a negative peak voltage.

* * * * *